US009323394B2

(12) United States Patent
Liu et al.

(10) Patent No.: US 9,323,394 B2
(45) Date of Patent: Apr. 26, 2016

(54) TOUCH CONTROL APPARATUS AND ASSOCIATED SELECTION METHOD

(71) Applicant: Wistron Corporation, New Taipei (TW)

(72) Inventors: You-Xin Liu, New Taipei (TW); Sheng-Hsien Hsieh, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 72 days.

(21) Appl. No.: 14/143,050

(22) Filed: Dec. 30, 2013

(65) Prior Publication Data

US 2014/0267173 A1    Sep. 18, 2014

(30) Foreign Application Priority Data

Mar. 15, 2013  (TW) .............................. 102109336 A

(51) Int. Cl.
*G06F 3/042* (2006.01)
(52) U.S. Cl.
CPC .................................... *G06F 3/0421* (2013.01)
(58) Field of Classification Search
None
See application file for complete search history.

(56) References Cited

U.S. PATENT DOCUMENTS

2006/0232792 A1* 10/2006 Kobayashi .................... 356/621
2009/0189878 A1*  7/2009 Goertz et al. ................. 345/175
2012/0218215 A1*  8/2012 Kleinert et al. ............... 345/173

FOREIGN PATENT DOCUMENTS

CN           101833401 A       9/2010
CN           101866246 A      10/2010

OTHER PUBLICATIONS

Full English (machine) translation of CN101833401 (Published Sep. 15, 2010).
TW Office Action dated Dec. 27, 2014.
Partial English translation of TW Office Action dated Dec. 27, 2014.
English Abstract translation of CN101866246 (Published Oct. 20, 2010).

* cited by examiner

*Primary Examiner* — Christopher R Lamb
(74) *Attorney, Agent, or Firm* — McClure, Qualey & Rodack, LLP

(57) ABSTRACT

A touch control apparatus includes a first light source, a first sensor, a second light source, a second sensor and a controller. A selection method for the touch control apparatus includes steps of: driving the first light to generate a first initial structured light; sensing a first reflected light distribution by the first sensor; driving the second light source to generate a second initial structured light; sensing a second reflected light by the second sensor; and, from multiple candidate touch positions, selecting positions corresponding to at least two touch points according to a first left reflected structured light, a second left reflected structured light, a first right reflected structured light and a second right reflected structured light.

22 Claims, 12 Drawing Sheets

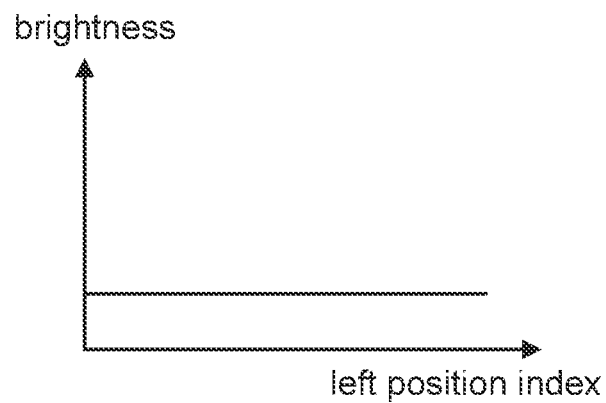
FIG. 5A
FIG. 5B
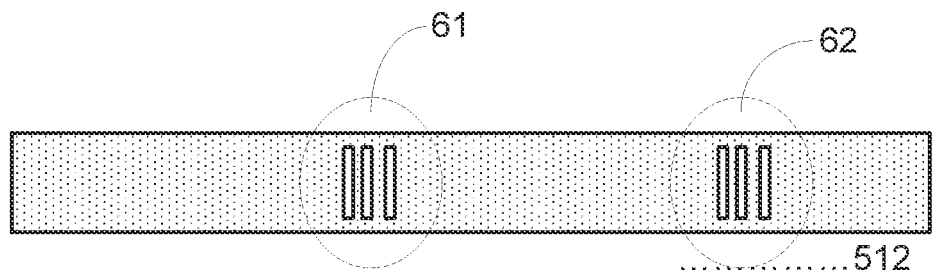
FIG. 6

| index position | first sensor small to large | | second sensor small to large | |
|---|---|---|---|---|
| P1, P2 ● | farther/narrow P2 | closer/wide P1 | farther/narrow P1 | closer/wide P2 |
| F1, F2 ◎ | closer/wide F1 | farther/narrow F2 | closer/wide F1 | farther/narrow F2 |

| index position | first sensor | | | second sensor | | |
|---|---|---|---|---|---|---|
| | small to large | | | small to large | | |
| G1 ● | closer/wide P3g1 | medium P2g1 | farther/narrow P1g1 | closer/wide P3g1 | medium P2g1 | farther/narrow P1g1 |
| G2 ◐ | medium P2g2 | farther/narrow P1g2 | closer/wide P3g2 | farther/narrow P3g2 | closer/wide P2g2 | medium P1g2 |
| G3 ○ | farther/narrow P1g3 | closer/wideP3 P3g3 | medium P2g3 | medium P3g3 | farther/narrow P2g3 | closer/wide P1g3 |

FIG. 15

TOUCH CONTROL APPARATUS AND ASSOCIATED SELECTION METHOD

This application claims the benefit of Taiwan application Serial No. 102109336, filed Mar. 15, 2013, the subject matter of which is incorporated herein by reference.

BACKGROUND OF THE INVENTION

1. Field of the Invention

The invention relates in general to a touch control apparatus and an associated selection method, and more particularly to an optical touch control apparatus and an associated selection method.

2. Description of the Related Art

Based on different operation principles, touch control technologies may be categorized into capacitive touch technology, resistive touch technology and optical touch technology. Among the touch control technologies, the optical touch technology calculates a position of a touch point through coordinates shielded by light, and can be easily applied to large-size applications while also having lower production costs.

FIG. 1A shows a schematic diagram of a conventional optical touch control apparatus determining a touch point of a single object. In short, in an optical touch control apparatus, after lights are emitted from light machines (M1 and M2), an image sensor detects whether a touch point (i.e. the object) exists to further determine coordinates of a position of the touch point.

The infrared light emitted from the light sources causes changes in a reflected light distribution at a position of the object. At this point, the image sensor, cooperating with a controller, may calculate the position of the touch point according to the changes in the reflected light distribution.

For illustration purposes, in the diagrams of the specification, an included angle formed by a connection line between the object O and the first light machine M1, and a fourth side IV of a display panel 14, is referred to as a left included angle $\theta l$. Similarly, an included angle formed by a connection line between the object O and the second light machine M2, and the fourth side IV of the display panel 14, is referred to as a right included angle $\theta r$. In the description below, it is assumed that sensors are disposed in the light machines, with M1 representing the first light machine/first sensor, and M2 representing the second light machine/second sensor.

In FIG. 1A, according to a triangle (L, R, IV) formed by the position of the object O and the two light machines (M1 and M2), the controller may obtain the upper-left angle and the upper-right angle (the left included angle $\theta l$ and the right included angle $\theta r$) of the triangle. Coordinates of the touch point can then be calculated by a triangle function.

However, the conventional optical touch technology is inadequate in providing accurate touch points for multi-touch applications. When the number of the objects is plural, a conventional optical touch control apparatus may generate confusions when determining the touch points due to different combinations of multiple left included angles $\theta l$ and right included angles $\theta r$.

In the description below, when a display panel generates multiple left included angles $\theta l$ and multiple right included angles $\theta r$ in the presence of multiple objects, numbers of the left included angles and the right included angles are defined in an increasing order of the included angles. For example, a smallest left included angle is numbered as $\theta l1$, a smallest right included angle is numbered as $\theta r1$, and so forth.

When there are multiple objects, a connection line L between the objects and the first light machine M1 is represented according to the numbers of the left included angles. Similarly, a connection line R between the objects and the second light machine M2 is also represented according to the numbers of the right included angles.

FIG. 1B shows a schematic diagram of a misjudgment on touch points by a conventional optical touch control apparatus when two objects exist on a display panel. In FIG. 1B, on a display panel 14, it is assumed that a position of a first object O1 is P1, and a position of a second object O2 is P2.

Therefore, according to a triangle formed by the first object O1, the first light machine M1 and the second light machine M2, a second left included angle $\theta l2$ and a first right included angle $\theta r1$ can be obtained. Similarly, according to a triangle formed by the second object O2, the first light machine M1 and the second light machine M2, a first left included angle $\theta l1$ and a second right included angle $\theta r2$ can be obtained.

It can be concluded from the above, when two objects exist on the display panel 14, the sensors sense four included angles, i.e., the first left included angle $\theta l1$, the second left included angle $\theta l2$, the first right included angle $\theta r1$ and the second right included angle $\theta r2$.

When estimating touch points according to the first left included angle $\theta l1$ with the first right included angle $\theta r1$ and the second right included angle $\theta r2$, respectively, the controller obtains a candidate touch position F1 and a candidate touch position P2.

Further, when estimating touch points according to the second left included angle $\theta l2$ with the first right included angle $\theta r1$ and the second right included angle $\theta r2$, respectively, the controller obtains a candidate touch position P1 and a candidate touch position F2.

That is to say, the four candidate positions (P1, P2, F1 and F2) can be derived from combinations of the four included angles. However, the candidate touch position F1 and the candidate touch position F2 are not actual positions of the touch points.

The controller determines the above candidate touch positions according to positions of shadows replied from the sensors. When selecting two out of four, two of the shadows are false, and are referred to ghost points. These ghost points lead the controller to misjudge the actual positions of the touch points, as in the example above. Thus, the candidate touch position F1 and the candidate touch position F2 in FIG. 1B are ghost points.

As previously stated, when there are two touch points, the first sensor obtains two left included angles, and the second sensor also obtains two right included angles. Combinations of the two left included angles and the two right included angles form four candidate touch positions. By deducting the actual positions of the touch points from the four candidate touch positions, there are two ghost points.

As the number of touch points increases, the number of shadows (the candidate touch positions) obtained by the sensors also becomes larger, meaning that possibilities of misjudging ghost points as touch points also get higher.

For example, with three objects (in equivalence to three touch points on the display panel), the first sensor senses to obtain three left included angles, and the second sensor also senses to obtain three right included angles. Combinations of the three left included angles and the three right included angles form nine candidate touch positions. After deducting actual positions of the touch points, there are as many as six ghost points.

It can be deduced that, the number of candidate touch positions is substantially equal to a square of the number of objects. Therefore, as the number of objects increases, when designing an optical touch control apparatus, there is a need for a solution for quickly eliminating positions of ghost points and to correctly select actual positions of touch points from numerous candidate touch positions.

SUMMARY OF THE INVENTION

According to an aspect of the present invention, a touch control apparatus is provided. The touch control apparatus, for selecting touch points corresponding to at least two objects from a plurality of candidate touch positions, includes: a display panel; a first light source, located at a left side of the display panel, for generating a first initial structured light, which is reflected by the at least two objects to form a first reflected light distribution; a first sensor, for sensing a first left reflected structured light and a second left reflected structured light in the first reflected light distribution; a second light source, located at a right side of the display panel, for generating a second initial structured light, which is reflected by the at least two objects to form a second reflected light distribution; a second sensor, for sensing a first right reflected structured light and a second right reflected structured light in the right light distribution; and a controller, electrically coupled to the first sensor and the second sensor, for selecting the touch points corresponding to the at least two objects from the candidate touch positions according to the first left reflected structured light, the second left reflected structured light, the first right reflected structured light, and the second right reflected structured light.

According to another aspect of the present invention, a selection method for selecting touch points corresponding to at least two objects from a plurality of candidate touch points on a touch control apparatus is provided. The selection method includes steps of: driving a first light source to generate a first initial structured light, and reflecting the first initial structured light by the at least two objects to form a first reflected light distribution; sensing a first left reflected structured light and a second left reflected structured light in the first reflected light distribution; driving a second light source to generate a second initial structured light, and reflecting the second initial structured light by the at least two objects to form a second reflected light distribution; sensing a first right reflected structured light and a second right reflected structured light in the second reflected light distribution; and selecting the touch points corresponding to the at least two objects from the plurality of candidate touch points according to the first left reflected structured light, the second left reflected structured light, the first right reflected structured light, and the second right reflected structured light.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 5A is a schematic diagram illustrating a relationship between a left position index and a left included angle;

FIG. 5B is a schematic diagram of a brightness distribution sensed by a sensor when an optical touch control apparatus utilizes light absorbent edge strips and when no touch point exists;

FIG. 6 is a schematic diagram of a sensor receiving a reflected structured light;

FIG. 15 is a schematic diagram of information generated by a first sensor and a second sensor from the three arrangements formed by three touch points;

DETAILED DESCRIPTION OF THE INVENTION

Figure 2:
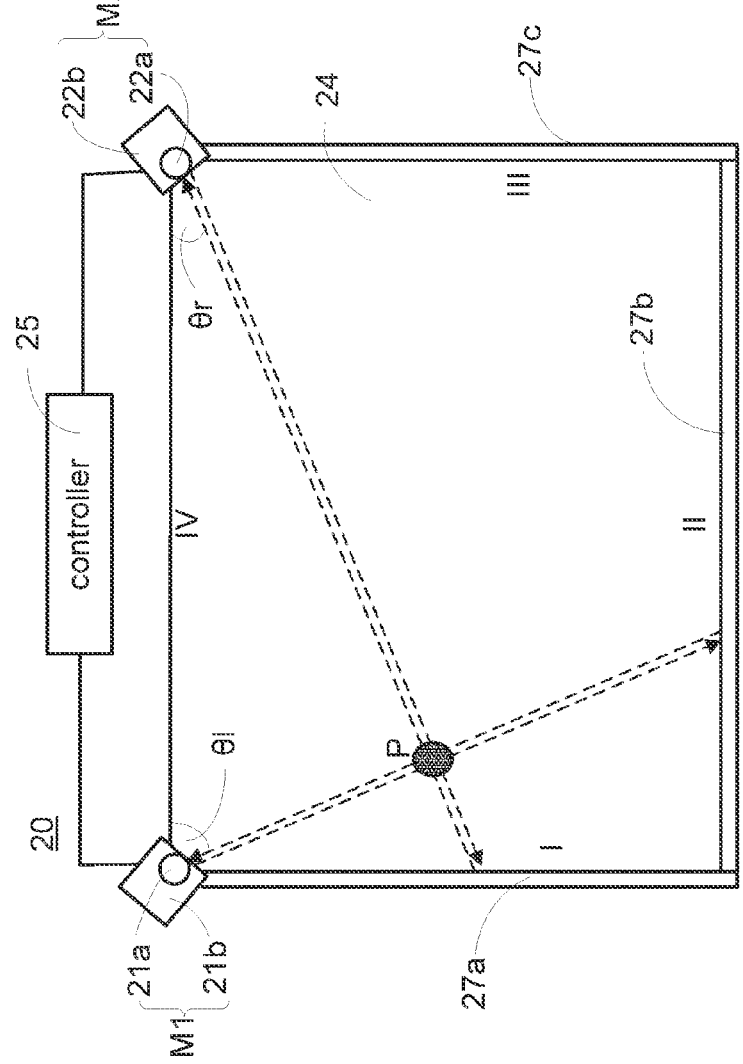
FIG. 2 is a schematic diagram of an optical touch control apparatus according to an embodiment of the present invention.
Figure 3C:
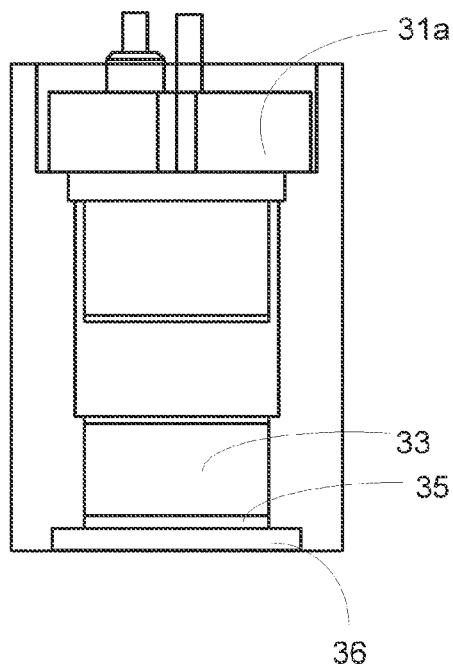
FIG. 3C is schematic diagram of a structure of a light machine operating with a collimation lens.

The present invention is directed to a touch control apparatus capable of selecting actual positions of touch points from a plurality of candidate touch positions and an associated selection method. FIG. 2 shows a schematic diagram of an optical touch control apparatus. A touch control apparatus 20 according an embodiment includes a display panel 24, a first light source 21a, a first sensor 21b, a second light source 22a, a second sensor 22b and a controller 25.

The display panel 24 is a rectangle having a first side I, a second side II, a third side III and a fourth side IV. In FIG. 2, the first side I and the third side III of the display panel 24 are parallel, and the second side II and the fourth side IV of the display panel 24 are parallel.

A first light machine M1 and a second light machine M2 are respectively disposed at an included angle formed by the first side I and the fourth side IV, and an included angle formed by the third side III and the fourth side IV. A lower edge (the second side II), a left edge (the first side I) and a right edge (the third side III) of the display panel 24 are respectively disposed with light absorbent edge strips 27a, 27b and 27c. When employing the light absorbent edge strips, most reflected light is absorbed by the light absorbent edge strips.

Each of the light machines includes an image sensor and a light source. The type of light sources of the touch control apparatus is not limited. For example, the light sources may be infrared light sources, laser light sources or light-emitting diode (hereinafter, LED) light sources.

When the light sources are laser light sources, collimation lenses and filters are additionally included (collimation lenses and filters are utilized in only laser light sources). In the description below, the light sources in the light machines are exemplified by laser light sources. In practice, the image sensors may be disposed at a same side as the light sources, or may be disposed diagonally to the light sources.

The controller 25, electrically coupled to the first sensor 21b and the second sensor 22b, selects a touch point corresponding to an object from candidate touch positions according to a first left reflected structured light SL1, a second left reflected structured light SL2, a first right reflected structured light SR1 and a second right reflected structured light SR2. Details of the first left reflected structured light SL1, the second left reflected structured light the first right reflected structured light SR1 and the second right reflected structured light SR2 will be illustrated later.

Figure 1A:
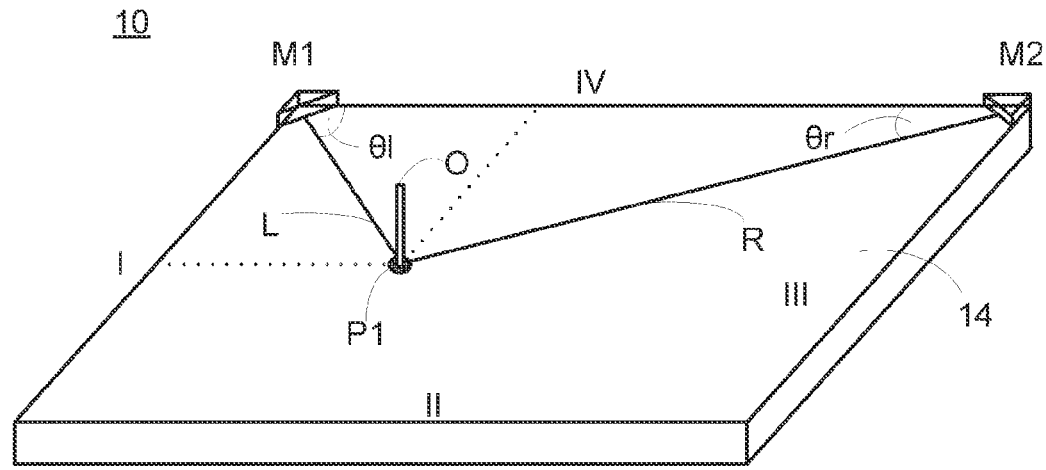
FIG. 1A (prior art) is a schematic diagram of a conventional optical touch control apparatus determining a touch point of a single object.
Figure 1B:
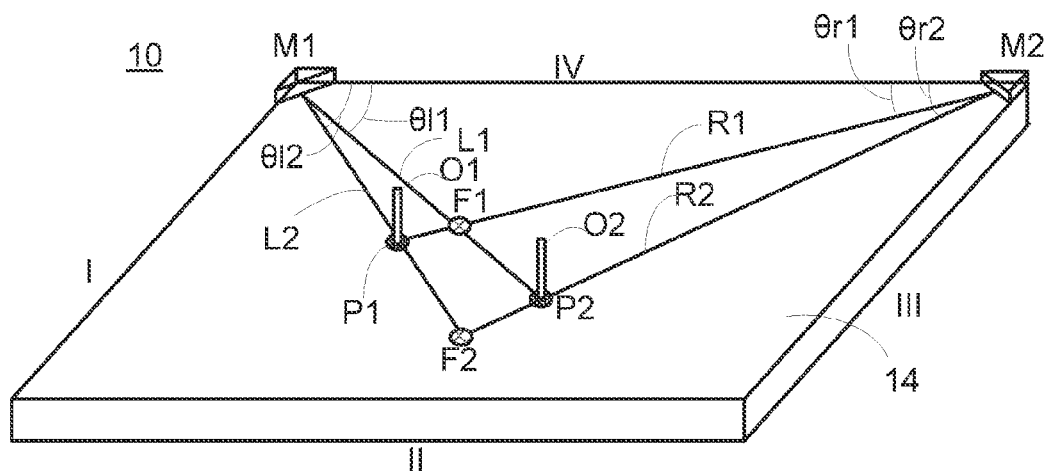
FIG. 1B (prior art) is a schematic diagram of a misjudgment on touch points by a conventional optical touch control apparatus when two objects exist on a display panel.
Figure 3A:
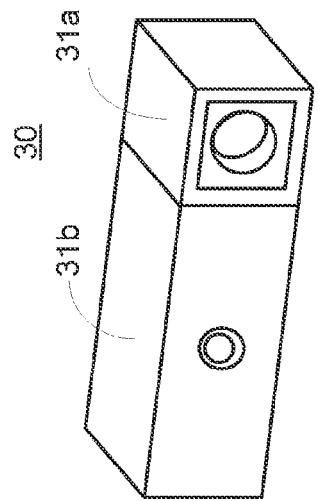
FIG. 3A is a diagram of a light machine applied with a display panel.
Figure 3B:
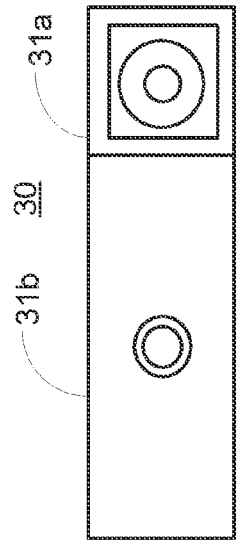
FIG. 3B is a front view of a sensor and a light machine applied with a display panel.

FIG. 3A shows a diagram of a light machine applied with a display panel. As seen from the appearance of the light machine 30, a sensor 31b and a light source 31a are side by side. FIG. 3B shows a front view of a sensor and a light machine applied with a display panel. FIG. 3O shows a schematic diagram of a structure of a light machine generating an emitted light.

After the light source 31a generates an emitted light, the emitted light passes through a collimation lens 33 disposed in front of the light source 31a to condense the emitted light into a dot light source. A plane light is formed from the dot light source through a filter 35 disposed in front of the collimation lens 33. A shutter 36 disposed in front of the filter 35 converts the plane light into an initial structured light, which is then reflected by an object to form a reflected structured light. Next, the sensor 31b receives the reflected structured light. In the present invention, on the foundation of an active light source and a shutter, a pattern of an initial structured light can be flexibly changed.

Taking the first light machine M1 for example, the first light source 21a is driven to emit a first emitted light. The first emitted light is condensed into a first dot light by a first collimation lens disposed in front of the first light source 21a. A first plane light source is formed from the first dot light source through a first filter disposed in front of the first collimation lens. A first shutter disposed in front of the first filter then converts the first plane light into a first initial structured light.

When the first initial structured light radiates upon a touch object (e.g., a user finger or a stylus), the first initial structured light is reflected by the touch object. At this point, a first reflected light distribution is formed as the touch object is near the lower edge of the display panel. Next, the first sensor 21b disposed at the display panel 24 senses the first reflected light distribution.

Operations and structures of the second light machine M2 are the same as those of the first light machine M1, and shall be omitted herein. A texture pattern of the shutter cause the initial structured light to have a plurality of initial bright lines and a plurality of initial dark lines. Shutters at the two sides may adopt identical or different texture patterns.

To keep a control details simple, it is assumed that widths of first initial bright lines are substantially equal, and widths of second initial bright lines are substantially equal. It is further assumed that widths of first initial dark lines are substantially equal, and widths of second initial dark lines are substantially equal. The widths of the initial bright lines are not necessarily equal to those of the initial dark lines.

Figure 4A:
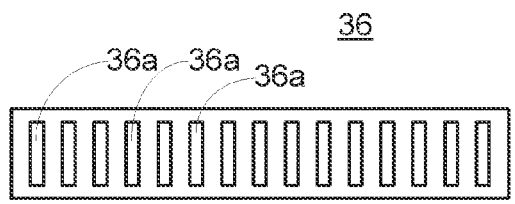
FIG. 4A is a schematic diagram of a shutter pattern.

FIG. 4A shows a schematic diagram of a shutter pattern. The light machine may emit a dot-like or line-like structure light through the shutter. As shown in FIG. 4A, the shutter 36 has multiple openings 36a. These openings 36a provide the shutter 36 with a texture pattern, meaning that a part of the plane light is shielded. Thus, the initial structured light is given different appearances and different combinations of initial bright lines and initial dark lines depending on the design of the shutter.

The present invention is directed to the relativity in the changes in reflected bright lines and reflected dark lines, and so the texture pattern of the shutter can be pre-learned. A person having ordinary skill in the art make modifications to the texture pattern of the shutter to change the initial bright lines and the initial dark lines and to further change the reflected bright lines and the reflected dark lines according to application requirements.

Figure 4B:
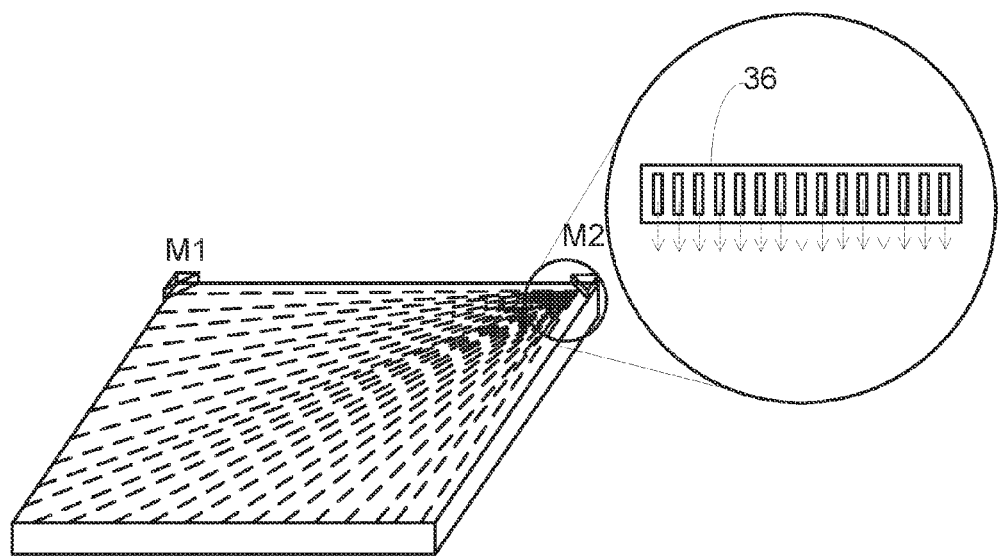
FIG. 4B is a schematic diagram of a second light source outputting a second initial structured light.

FIG. 4B shows a schematic diagram of a second light source outputting a second initial structured light. As seen from FIG. 4B, the second light machine generates a second initial structured light having a plurality alternating bright lines and dark lines. The second initial structured light is emitted from the upper-right corner (the included angle between the fourth side IV and the third side III) of the display panel to the light absorbent edge strips at the sides.

It should be noted that, although beams of the emitted light in FIG. 4B appear to be diverged, the beams are not shifted within the range of the display panel due to a high density of the shutter and a small area of the display panel. Therefore, the beams of the emitted light are in fact parallel to one another, as shown in an enlarged view at the upper-right part of FIG. 4B.

FIG. 5A shows a schematic diagram illustrating a relationship between a left position index and a left included angle. It is assumed that included angle ranges detectable by the first sensor M1 and the second sensor M2 are both 90 degrees. Included angle ranges of the sensors are not limited to the above example.

According to a concept of the present invention, the 90-degree left included angle detectable by the first sensor M1 may be represented by a plurality of left position indices. For example, a left position index 1 represents 0 degree, a left position index 512 represents 90 degrees, and corresponding relationships between the remaining degrees and left position indices are calculated by ratio through interpolation, or determined according to a predefined method. It should be noted that, the number and the range of the left position indices are not limited to particular values.

FIG. 5B shows a schematic diagram of a brightness distribution sensed by the sensor when an optical touch control apparatus utilizes light absorbent edge strips and when no touch point exists. When the structured light comes into contact with the light absorbent edge strips, the structured light is scattered such that the structured light is incapable of entering the lens. As such, only an image with a very low brightness level is obtained.

At this point, when no object exists on the display panel, the first reflected light distribution received by the first sensor M1 and the second reflected light distribution received by the second sensor M2 both display a low brightness level.

In contrast, when an object O exists on the display panel, the first/second initial structured light is reflected by the object O. At this point, the first reflected light distribution received by the first sensor M1 and the second reflected light distribution received by the second sensor M2, at a position corresponding to the object O, display a left reflected structured light SL and a right reflected structured light SR, respectively.

As the structured light is dot-like, the structured light reflected to the lens is a light in dots arranged in a straight line (substantial equal to a plurality of reflected bright lines). It is assumed that the sensor is a common lens, which then perceives an image containing a large part in a high brightness level and a small part in a low brightness level. Positions with the high brightness level imply the reflected structured light reflected by the object.

FIG. 6 shows a schematic diagram of a sensor receiving a reflected structured light. In FIG. 6, it is assumed that two touch points exist on the display panel, and so the first sensor M1 obtains two left reflected structure lights SL from the first reflected light distribution. It is further assumed that, the first touch point P1 corresponds to a first left reflected structured light 61, and the second touch point P2 corresponds to a second left reflected structured light 62.

For illustration purposes, the first left reflected structured light 61 and the second left reflected structured light 62 are assumed to include three reflected bright lines and two reflected dark lines, respectively. In practice, the numbers of the reflected bright lines and the reflected dark lines may change according to different sizes of objects. For example, when performing touch control with a finger, the number of the reflected bright lines and the reflected dark lines may be more than when performing touch control with a stylus.

Figure 7A:
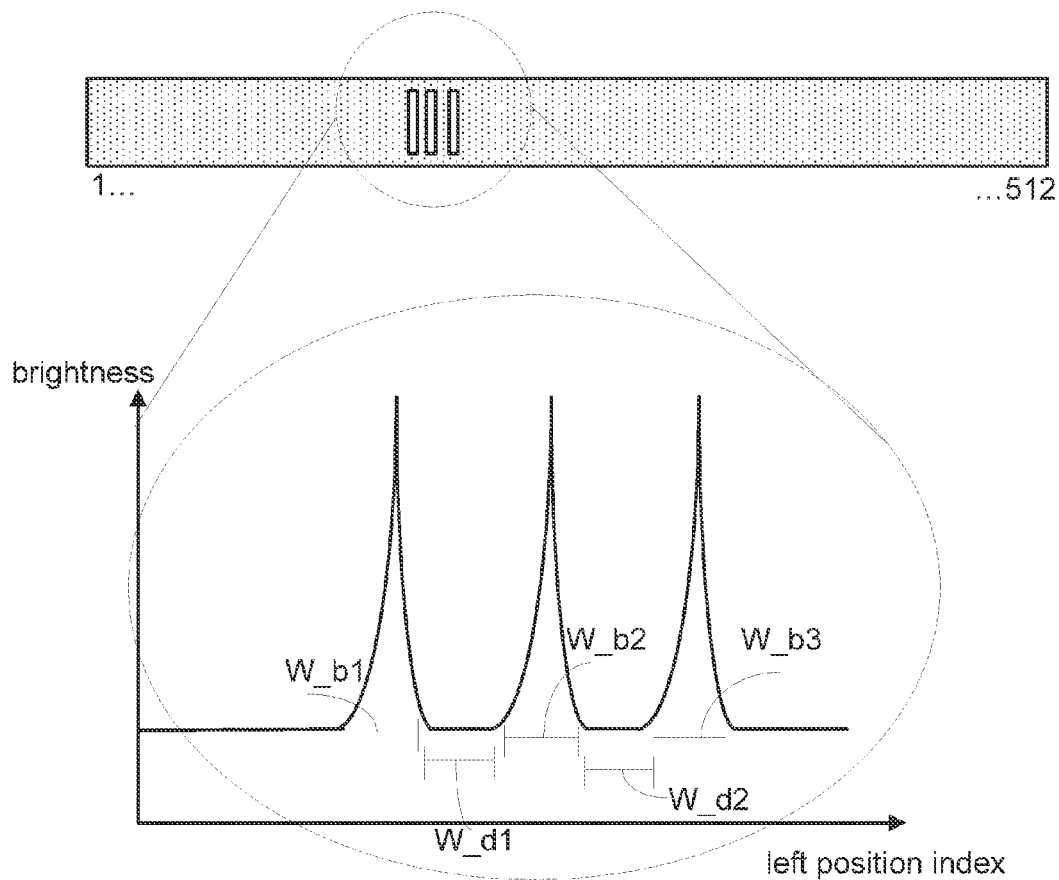
FIG. 7A is a schematic diagram of a sensor sensing reflected bright lines and reflected dark lines of a reflected structured light.

FIG. 7A shows a schematic diagram of a sensor sensing reflected bright lines and reflected dark lines of a reflected structured light in a touch control apparatus. By representing the reflected structured light in a numerical approach, a relationship between the brightness level and the left position index is formed. The brightness level corresponding to the reflected bright lines is higher, and the brightness level of the reflected dark lines and other sections is lower.

Although actual widths of the reflected bright/dark lines do not change with a relative distance between an object and a sensor, a sensing result obtained by the lens is nevertheless capable of determining positions where the reflected bright/dark lines are generated. According to a concept of the present invention, when an object is relatively closer to a light source, in a reflected structured light sensed by a sensor, both reflected bright lines and reflected dark lines are wider than the case that the object is located relatively farther from the light source. Due to a camera resolution, when an object sensed by a lens is closer, a greater number of pixels are required for presenting a sensing result.

From left to right in the diagram, a width of a first reflected bright line is defined as $W\_b1$, a width of a second bright line is defined as $W\_b2$, and a width of a third bright line is defined as $W\_b3$. Since widths of initial bright lines in an initial structured light are substantially equal, widths of the reflected bright lines are also substantially equal.

Similarly, a width of a first reflected dark line is defined as $W\_d1$, a width of a second dark line is defined as $W\_d2$, and a width of a third dark line is defined as $W\_d3$. Since widths of initial dark lines in an initial structured light are substantially equal, widths of the reflected dark lines are also substantially equal.

Figure 7B:
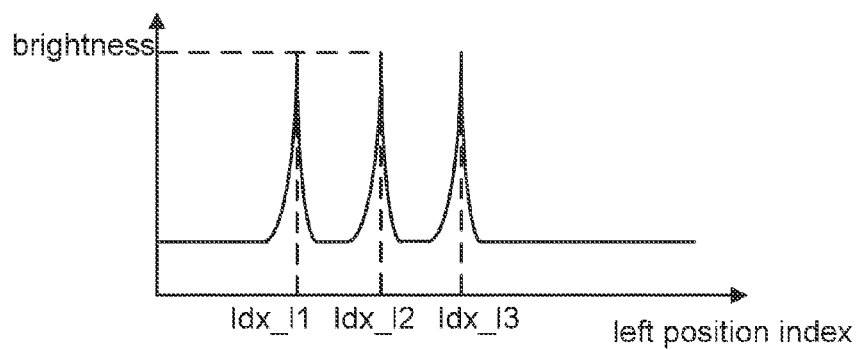
FIG. 7B is a schematic diagram determining a position of a touch point by a reflected structured light.

FIG. 7B shows a schematic diagram of determining a position of a touch point by a reflected structured light. According to index positions corresponding to the reflected bright lines, an average density (hereinafter, AD) of the reflected structured light can be calculated. According to widths of the reflected bright lines, an average width (hereinafter, AW) can also be calculated.

The touch control apparatus may further include a storage element. The storage element is built-in with a look-up table (hereinafter, LUT) of the average density AD and the average width AW. The LUT records a corresponding relationship of coordinates of the display panel with the average density AD and the average width AW. As such, when the sensor (lens) obtains the average density AD and the average width AW of an object, the sensor may directly find accurate coordinates of the object on the display panel through the LUT.

It should be noted that, in the following description, the widths of the reflected bright/dark lines may represent average widths or widths obtained from a weighted calculation. That is to say, the widths of the reflected bright/dark lines may be defined according to application requirements.

When a plurality of touch points are close to one another, different reflected structured lights may also be quite close to one another. At this point, the reflected light distribution sensed by the sensor may first undergo a grouping process of reflected structured lights. That is, neighboring reflected structured lights are firstly separated from one another, and relative distances of the reflected bright/dark lines in each of the reflected structured lights are then determined.

As reflected bright lines and reflected dark lines have similar characteristics, reflected bright lines are taken as an example in the following description. Details for determining a relative distance between a touch point and a sensor according to the width of reflected dark lines can be similarly deduced from description associated with reflected bright lines.

Figure 8:
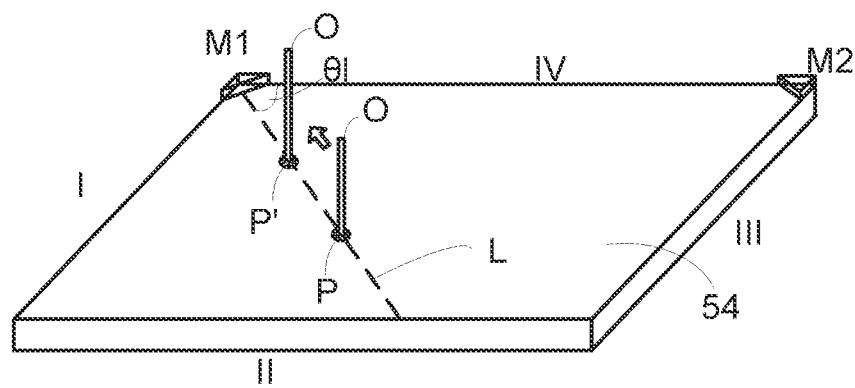
FIG. 8 is a schematic diagram of a touch control apparatus determining a relative distance between a touch point and a first sensor.

FIG. 8 shows a schematic diagram of a touch control apparatus determining a relative distance between a touch point and a first sensor. In FIG. 8, an example of objects are located at a touch point P and a touch point P', respectively.

For the first sensor (lens), as a distance between an object and the first sensor decreases, in a reflected light distribution, the brightness level of a light traveling back to the lens gets higher/larger (with the width of reflected bright lines also getting wider), and width of reflected dark lines becomes wider as well. In contrast, as the distance between the object and the lens increases, the brightness level of the light traveling back to the lens gets lower/smaller (with the width of the reflected bright lines also getting narrower), and the width of the reflected dark lines becomes narrower as well.

Similarly, a change in the relative distance between the object and the second sensor also affects the width of the reflected bright lines and the width of the reflected dark lines. The determination method of the second sensor is similar to that of the first sensor, and shall be omitted herein.

Figure 9A:
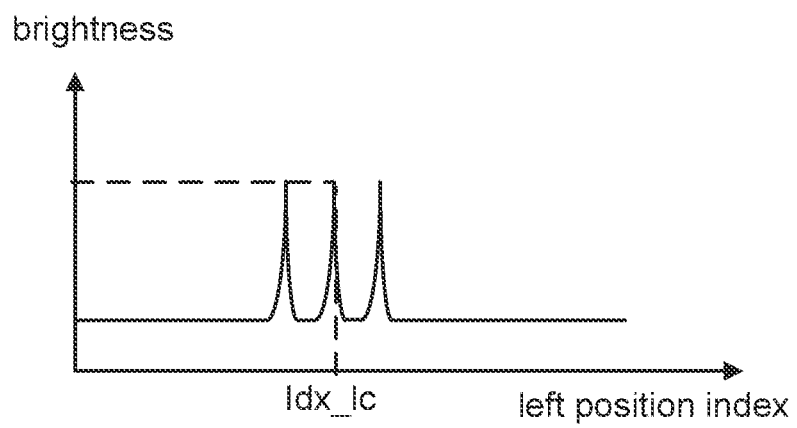
FIG. 9A is a schematic diagram of a relationship between a left position index and a left reflected structure light when a touch point is located at a touch position P in FIG. 8.
Figure 9B:
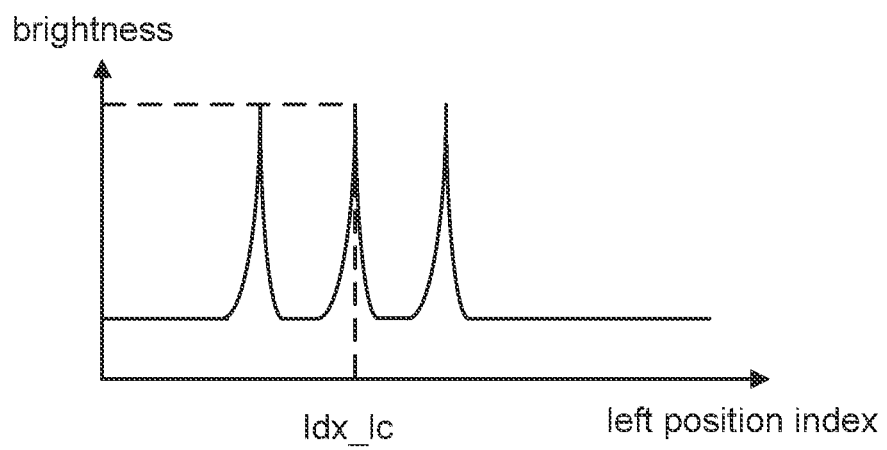
FIG. 9B is a schematic diagram of a relationship between a left position index and a left reflected structure light when a touch point is located at a touch position P' in FIG. 8.

FIG. 9A shows a schematic diagram of a relationship between a left position index and a left reflected structure light when a touch point is located at the position P in FIG. 8. FIG. 9B shows a schematic diagram of a relationship between a left position index and a left reflected structure light when a touch point is located at the position P' in FIG. 8. As seen from FIGS. 9A and 9B, the reflected bright lines in the middle of FIG. 9A and the reflected bright lines in the middle of FIG. 9B have a same left position index Idx_Ic.

However, by further comparing brightness levels of the reflected bright lines, it is found that the brightness level in FIG. 9A is lower. That is, as the relative distance between the same object and the sensor decreases, the brightness level of the reflected bright lines in the reflected structured light generated becomes higher. Further, the width of the three reflected bright lines in FIG. 9A is noticeably smaller than the ones in FIG. 9B, and the width of the reflected dark lines in FIG. 9A is noticeably smaller than the ones in FIG. 9B.

When the relative distance between the touch point and the first sensor M1 is changed while the left included angle stays constant, changes occur in the characteristics of the left reflected structured light sensed by the first sensor M1 whereas the left position index corresponding to the first reflected bright line remains the same.

For example, when the position of the touch point moves from P to P', as the relative distance is decreased, the widths of the reflected bright/dark lines of the left reflected structured light also become wider.

That is to say, as the relative distance between the object and the sensor increases, the reflected bright lines and the reflected dark lines in the reflected structure light appear more concentrated, and the brightness level of the reflected bright lines gets lower. Therefore, according to the above characteristics, the controller of the present invention determines the relative distance between the object and the sensor.

Figure 10:
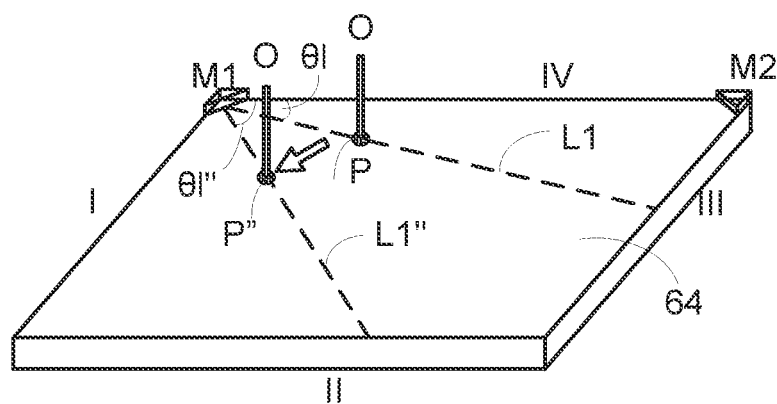
FIG. 10 is a schematic diagram determining a relative distance between one touch point and the first sensor.
Figure 11A:
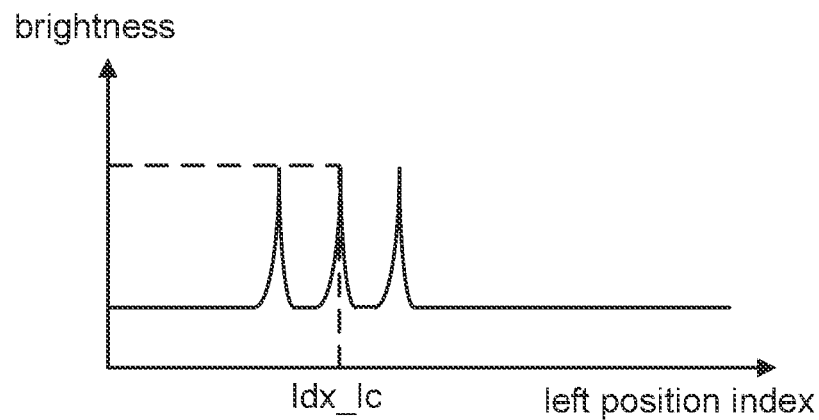
FIG. 11A is a schematic diagram of a relationship between a left position index and a left reflected structured light when a touch point is at a position P in FIG. 10.
Figure 11B:
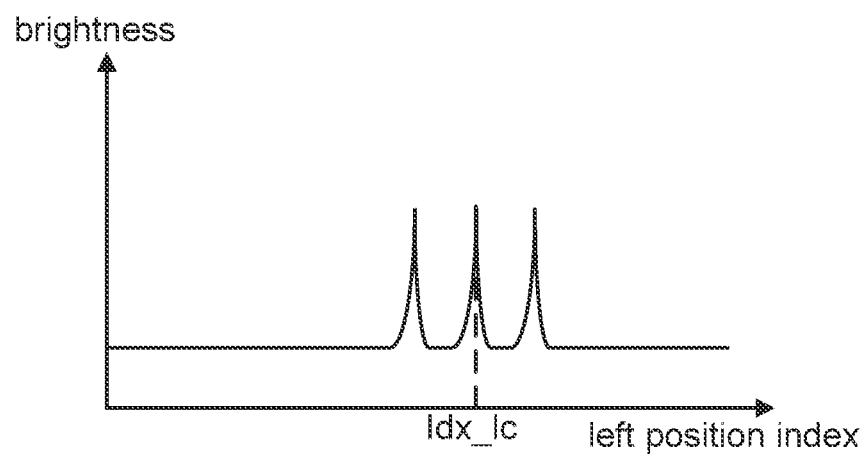
FIG. 11B is a schematic diagram of a relationship between a left position index and a left reflected structured light when a touch point is at a position P'' in FIG. 10.

FIG. 10 shows a schematic diagram of determining a relative distance between one touch point and the first sensor. In FIG. 10, an example of an object O located at the positions P and P''' is illustrated. FIG. 11A and FIG. 11B show schematic diagrams of relationships between a left position index and a left reflected structured light when a touch point is respectively located at the positions P and P''' in FIG. 10.

By comparing FIGS. 11A and 11B, it is observed that the reflected structured light distribution of the former is closer to the left, due to a smaller left included angle of P. On the other hand, the relative distance between the object in FIGS. 11A and 11B and the first light machine M1 is not changed. Therefore, the width of the reflected bright lines and the width of the reflected dark lines in FIGS. 11A and 11B are substantially the same.

In other words, when the relative distance between the touch point and the first sensor M1 stays constant while the position of the touch point is changed, the distribution (the numbers and the widths of the reflected bright/dark lines) of the left reflected structure light sensed by the first sensor M1 remains the same, whereas the value of the first left position index Idx_I1 changes according to the change in the left included angle.

Figure 12A:
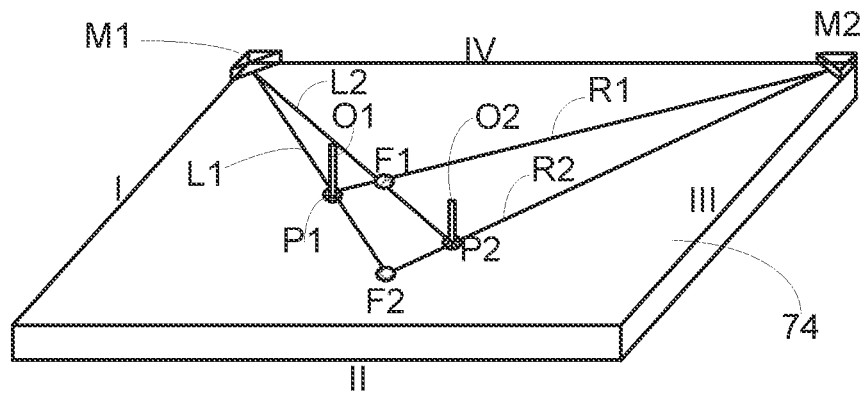
FIG. 12A is a schematic diagram of two touch points existing on a touch control apparatus.

FIG. 12A shows a schematic diagram of two touch points existing on a touch control apparatus. For illustration purposes, a distance between a first touch point P1 and the first sensor M1 is defined as a first left relative distance Dist (P1, M1 ), a distance between a second touch point P2 and the first sensor M1 is defined as a second left relative distance Dist(P2, M1), a distance between the first touch point P1 and the second sensor M2 is defined as a first right relative distance Dist(P1, M2), and a distance between the second touch point P2 and the second sensor M2 is defined as a second right relative distance (P2, M2). Details about how to determine which of these relative distances are longer will be illustrated below.

The first left reflected structured light SL1 and the first right reflected structure light SR1 correspond to the first touch point P1. The second left reflected structured light SL2 and the second right reflected structured light SR2 correspond to the second touch pint P2. Each of the first left reflected structured light SL1, the second left reflected structured light SL2, the first right reflected structure light SR1 and the second right reflected structured light SR2 includes a plurality of alternating reflected bright lines and reflected dark lines.

That is to say, when there are two touch points, the first reflected light distribution includes the first and the second left reflected structured lights SL1 and SL2 , and the second reflected light distribution includes the first and the second right reflected structured lights SR 1 and SR2.

When the touch control apparatus obtains the candidate touch positions P1, P2, F1 and F2 according to a triangle positioning method, the controller needs to determine whether the touch points are a combination of the candidate touch positions P1 and P2, or a combination of the candidate touch positions F1 and F2. A situation of objects located at the candidate touch positions P1 and P2 is discussed below with reference to FIGS. 12B and 12C.

Figure 12B:
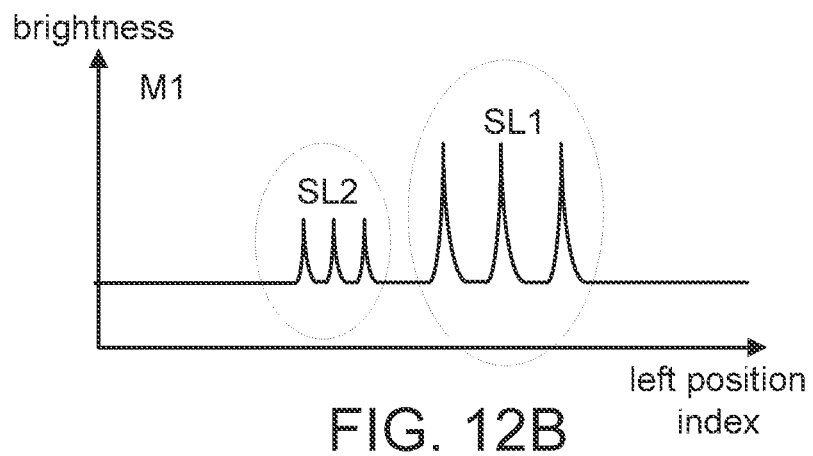
FIG. 12B is a schematic diagram of a relationship between brightness levels of left reflected structured lights and left position indices when two touch points exist on a touch control apparatus.

FIG. 12B shows a schematic diagram of a relationship between brightness levels of left reflected structured lights and left position indices when two touch points exist on a touch control apparatus. As previously stated, as a relative distance between an object and a sensor increases, reflected bright lines and reflected dark lines of a reflected structured light appear more concentrated and a brightness level of the reflected bright lines is lower. Thus, the controller may obtain the following information according to the corresponding relationship between the left position index and the left reflected structured light.

The reflected structured light corresponding to a smaller left position index has narrower reflected bright/dark lines. It means that a touch point having a smaller left included angle is farther from the first sensor M1.

Further, the reflected structured light corresponding to a greater left position index has wider reflected bright/dark lines. It means that a touch point having a greater left included angle is closer to the first sensor M1.

Comparing the candidate touch positions (P1, P2) with the candidate touch positions (F1, F2), it is observed only the candidate touch positions (P1, P2) satisfy the foregoing conditions. Therefore, the controller may determine P1 and P2 as the touch points according to the information (in FIG. 12B) sensed by the first sensor M1. Further, in FIG. 12B, the smaller left position index corresponds to the second left reflected structured light SL2, and the larger left position index corresponds to the first left reflected structured light SL1.

Figure 12C:
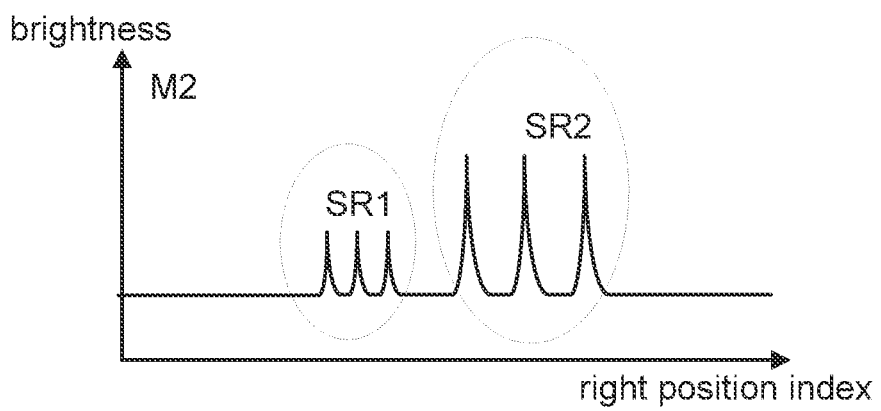
FIG. 12C is a schematic diagram of a relationship between brightness levels of right reflected structured lights obtained by the second sensor and right position indices when two touch points exist on a touch control apparatus.

FIG. 12C shows a schematic diagram of a relationship between brightness levels of right reflected structured lights obtained by the second sensor and right position indices when two touch points exist on a touch control apparatus.

Similarly, the controller may obtain the following information according to the corresponding relationship between the right position index and the right reflected structured light.

The reflected structured light corresponding to a smaller right position index has narrower reflected bright/dark lines.

It means that a touch point having a smaller right included angle has a greater relative distance from the second sensor M2.

Further, the reflected structured light corresponding to a greater right position index has wider reflected bright/dark lines. It means that a touch point having a greater right included angle has a smaller relative distance from the second sensor M2.

Comparing the candidate touch positions (P1, P2) with the candidate touch positions (F1, F2), it is observed only the candidate touch positions (P1, P2) satisfy the foregoing conditions. Therefore, the controller may determine P1 and P2 as the touch points according to the information (in FIG. 12C) sensed by the second sensor M2. Further, in FIG. 12C, the smaller right position index corresponds to the first right reflected structured light SR1, and the larger right position index corresponds to the second right reflected structured light SR2.

It should be noted that, when the actual positions of the touch points are the candidate touch positions F1 and F2, the corresponding relationship of light dot distribution also changes. Although associated details are not given, a person having ordinary skill in the art can still easily deduce and apply the foregoing method.

Information sensed by the sensors when two touch points are located at the candidate touch positions P1 and P2, and at the candidate touch positions F1 and F2 are compared with reference to FIG. 13 below.

Figures 13, 14:
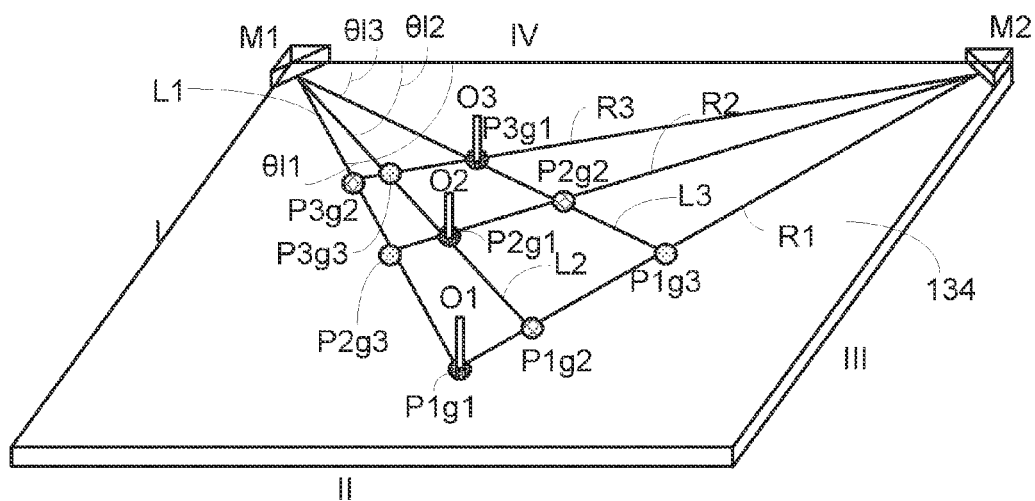
FIG. 13 is a schematic diagram for determining which of the candidate touch positions (P1, P2) and (F1, F2) are touch points according to information generated by a first sensor and a second sensor when two objects exist on a display panel.
FIG. 14 is a schematic diagram determining touch points of three objects by a touch control apparatus and a selection.

FIG. 13 shows a schematic diagram for determining which of the candidate touch positions (P1, P2) and (F1, F2) are touch points according to information generated by the first sensor and the second sensor when two objects exist on the display panel.

One type of the structured lights sensed by the first sensor M1 and the second sensor M2 is firstly discussed. Between two reflected structured lights sensed by the first sensor M1, the reflected structured light having a smaller left position index value is assumed to have narrower bright lines (representing the relative distance between the object corresponding to smaller left included angle and the first sensor M1 is farther), and the reflected structured light having a greater left position index value is assumed to have wider reflected bright lines (representing the relative distance between the object corresponding to larger left included angle and the first sensor M1 is closer). Further, between two reflected structured lights sensed by the second sensor M2, the reflected structured light having a smaller right position index value is assumed to have narrower bright lines (representing the relative distance between the object corresponding to smaller right included angle and the second sensor M2 is farther), and the reflected structured light having a greater right position index value is assumed to have wider reflected bright lines (representing the relative distance between the object corresponding to larger right included angle and the second sensor M2 is closer). Consequently, the controller may determine that the touch points of the two objects are P1 and P2.

Another type of the structured lights sensed by the first sensor M1 and the second sensor M2 is then discussed. Between two reflected structured lights sensed by the first sensor M1, the reflected structured light having the smaller left position index value is assumed to have wider reflected bright lines (representing the relative distance between the object corresponding to smaller left included angle and the first sensor M1 is closer), and the reflected structured light having the larger left position index value is assumed to have narrower reflected bright lines (representing the relative distance between the object corresponding to larger left included angle and the first sensor M1 is farther). Further, between two reflected structured lights sensed by the second sensor M2, the reflected structured light having the smaller right position index value is assumed to have wider reflected bright lines (representing the relative distance between the object corresponding to smaller right included angle and the second sensor M2 is closer), and the reflected structured light having the larger right position index value is assumed to have narrower reflected bright lines (representing the relative distance between the object corresponding to larger right included angle and the second sensor M2 is farther). Consequently, the controller may determine that the touch points of the two objects are F1 and F2.

Similarly, when there are three touch points, the first reflected light distribution includes a first, a second and a third left reflected structured lights SL1, SL2 and SL3. The second reflected light distribution includes a first, a second, and a third right reflected structured lights SR1, SR2 and SR3. According to the first, the second and the third left reflected structured lights SL1, SL2 and SL3, and the first, the second and the third right reflected structured lights SR1, SR2 and SR3, the controller may further select positions of the three touch points from the candidate touch positions.

FIG. 14 shows a schematic diagram of determining touch points of three objects by a touch control apparatus and a selection method. In FIG. 14, it is assumed that three objects (O1, O2 and O3) are located at three positions P1g1, P2g1 and P3g1 on the display panel, respectively.

A connection line L1 between the first object O1 and the first light machine M1, with the fourth side IV of the display panel, forms a left included angle $\theta l1$. A connection line L2 between the second object O2 and the first light machine M1, with the fourth side IV of the display panel, forms a left included angle $\theta l2$. A connection line L3 between the third object O3 and the first light machine M1, with the fourth side IV of the display panel, forms a left included angle $\theta l3$.

Similarly, a connection line R1 between the first object O1 and the second light machine M2, with the fourth side IV of the display panel, forms a right included angle $\theta r1$. A connection line R2 between the second object O2 and the second light machine M2, with the fourth side IV of the display panel, forms a right included angle $\theta r2$. A connection line R3 between the third object O3 and the second light machine M2, with the fourth side IV of the display panel, forms a right included angle $\theta r3$.

However, nine candidate touch positions may be generated from the three left included angles ($\theta l1$, $\theta l2$ and $\theta l3$) and three right included angles ($\theta r1$, $\theta r2$, and $\theta r3$). A first arrangement is composed of the candidate touch position P1g1, the candidate touch position P2g1, and the candidate touch position P3g1. A second arrangement is composed of a candidate touch position P1g2, a candidate touch position P2g2 and a candidate touch position P3g2. A third arrangement is composed of a candidate touch position P1g3, a candidate touch position P2g3 and a candidate touch position P3g3.

Similarly, in the present invention, by comparing the widths of the reflected bright/dark lines in the left reflected structured light sensed by the first sensor M1, and by comparing the widths of the reflected bright/dark lines in the right reflected structured light sensed by the second sensor M2, actual touch positions of the three objects can be determined.

FIG. 15 shows a schematic diagram of information generated by the first sensor and the second sensor from the three arrangements formed by the three touch points. In the description below, reflected structured lights are illustrated toward a direction of increasing position indices (corresponding to left/right included angles in an increasing order).

When the first arrangement is displayed, i.e., the three touch points are located at P1g1, P2g1 and P3g1, respectively. According to the corresponding left position index sequence in ascending order, the reflected structured lights sensed by the first sensor M1 are in the following sequence: the reflected structured light having wide-width reflected bright lines (representing a closer relative distance between the touch point and the first sensor M1), the reflected structured light having medium-width reflected bright lines, and the reflected structured light having narrow-width reflected bright lines (representing a farther relative distance between the touch point and the first sensor M1).

According to the corresponding right position index sequence, the reflected structured lights sensed by the second sensor M2 are in the following sequence: the reflected structured light having wide-width reflected bright lines (representing a closer relative distance between the touch point and the second sensor M2), the reflected structured light having medium-width reflected bright line, and the reflected structured light having narrow-width reflected bright lines (representing a farther relative distance between the touch point and the second sensor M2).

In other words, when the touch control apparatus finds that the reflected structured lights satisfy the above conditions according to the sensing results of the two sensors, the touch control apparatus may determine that the three touch points form the first arrangement.

When the second arrangement is displayed, i.e., the three touch points are located at P1g2, P2g2 and P3g2, respectively. According to the corresponding left position index sequence in ascending order, the reflected structured lights sensed by the first sensor are in the following sequence: the reflected structured light having medium-width reflected bright lines, the if) reflected structured light having narrow-width reflected bright lines (representing a farther relative distance between the touch point and the first sensor M1), and the reflected structured light having wide-width reflected bright lines (representing a closer relative distance between the touch point and the first sensor M1.

According to the corresponding right position index sequence, the reflected structured lights sensed by the second sensor M2 are in the following sequence: the reflected structured light having reflected narrow-width bright lines (representing a farther relative distance between the touch point and the second sensor M2), the reflected structured light having wide-width reflected bright lines (representing a closer relative distance between the touch point and the second sensor M2), and the reflected structured light having medium-width reflected bright lines.

In other words, when the touch control apparatus finds that the reflected structured lights satisfy the above conditions according to the sensing results of the sensors, the touch control apparatus may determine that the three touch points form the second arrangement.

When the third arrangement is displayed, i.e., the three touch points are located at P1g3, P2g3 and P3g3, respectively. According to the corresponding left position index sequence in ascending order, the reflected structured lights sensed by the first sensor M1 are in the following sequence: the reflected structured light having reflected narrow-width bright lines (representing a farther relative distance between the touch point and the first sensor M1), the reflected structured light having wide-width reflected bright lines (representing a closer relative distance between the touch point and the first sensor M1), and the reflected structured light having medium-width reflected bright lines.

According to the corresponding right position index sequence in ascending order, the reflected structured lights sensed by the second sensor M2 are in the following sequence: the reflected structured light having medium-width reflected bright lines, the reflected structured light having narrow-width reflected bright lines (representing a farther relative distance between the touch point and the second sensor M2), and the reflected structured light having wide-width reflected bright lines (representing a closer relative distance between the touch point and the second sensor M2).

In other words, when the touch control apparatus finds that the reflected structured lights satisfy the above conditions according to the sensing results of the sensors, the touch control apparatus may determine that the three touch points form the third arrangement.

When the positions of the touch points display the three arrangements, the position indices/reflected structured light sequence sensed by the sensors contain particularity. Therefore, the touch control apparatus and selection method of the present invention may accordingly determine touch points where objects are located from a plurality of candidate touch positions.

Further, when the touch control apparatus utilize light absorbent edge strips, in addition to the first and the second left reflected structured lights SL1 and SL2, the first reflected light distribution further includes at least one left extinct light section. Similarly, in addition to the first and the second right reflected structured lights SR1 and SR2, the second reflected light distribution further includes at least one right extinct light section. The left extinct light section and the right extinct light section represent a part of the light absorbent edge strips that are not shielded by the touch points.

For example, when the first touch point P1 and the second touch point P2 are located at sides of the display panel, one left extinct light block exists. When one of the touch points is located at one side while the other touch point is within a display region of the display panel, two left extinct light sections exist. Alternatively, when both of the touch points are within the display panel, three left extinct light sections exist.

Figure 16:
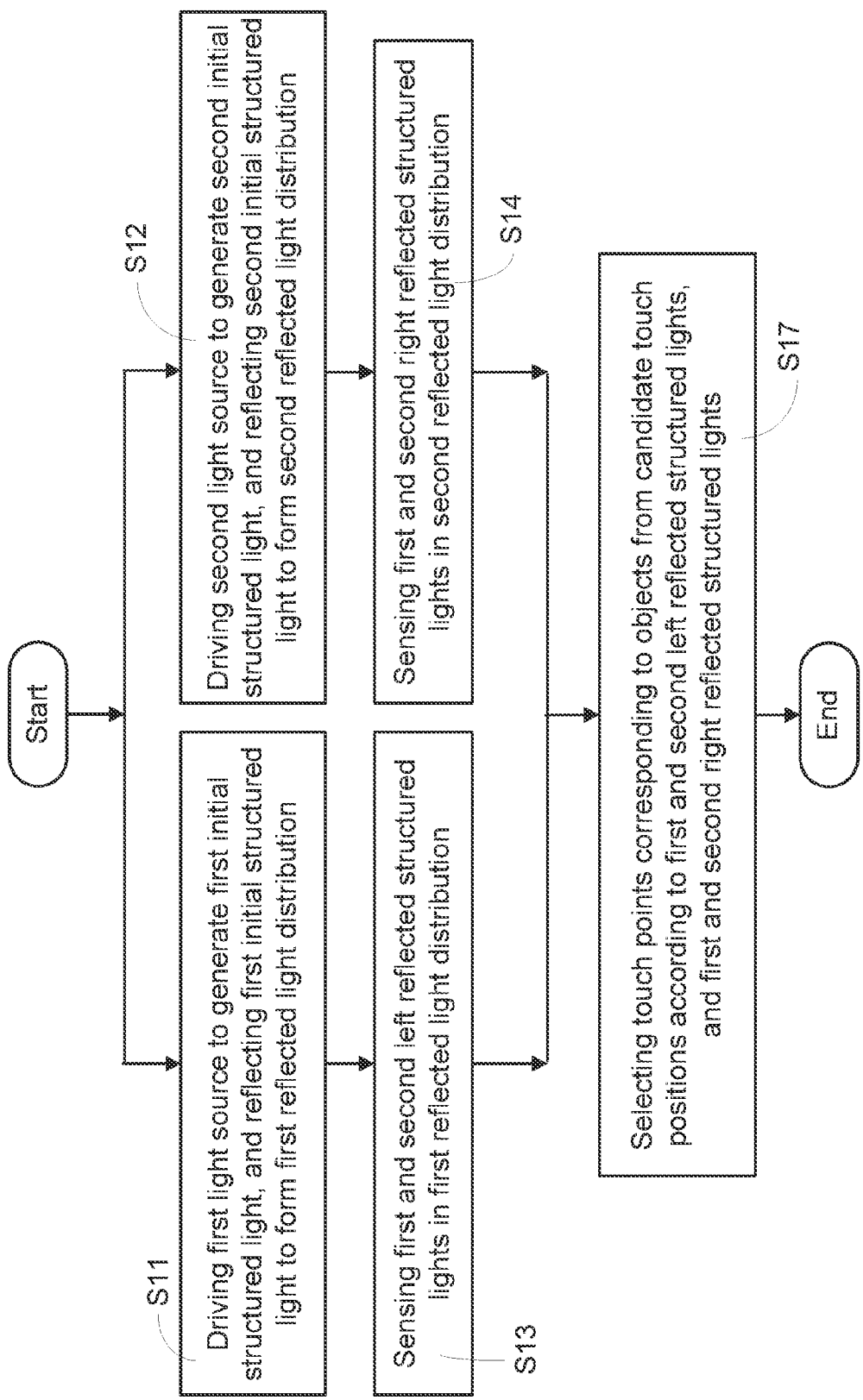
FIG. 16 is a flowchart of a selection method, applied to a touch panel, for selecting positions of least two touch points from a plurality of candidate touch positions.

FIG. 16 shows a flowchart of a selection method, applied to a touch panel, for selecting positions of least two touch points from plural candidate touch positions. The process on the left branch and the process on the right branch can be simultaneously performed or performed in sequence. Further, the sequence of the two branched processes is not limited when the two branched processes are performed in sequence.

The process of the left branch is as follows. In step S11, the first light source is driven to generate the first initial structured light. The first initial structured light is reflected by objects to form the first reflected light distribution. In step S13, the first and the second left reflected structured lights in the first left light distribution are sensed by the first sensor M1.

The process of the right branch is as follows. In step S12, the second light source is driven to generate the second initial structured light. The second initial structured light is reflected by the objects to form the second reflected light distribution. In step S14, the first and the second right reflected structured lights in the second reflected light distribution are sensed by the second sensor M2.

After completing the two branched processes, in step S17, the controller selects the touch points corresponding to the objects from the candidate touch positions according to the first and the second left reflected structured lights SL1 and SL2, the first and the second right reflected structured lights SR1 and SR2.

Actual details of step S17 may change according to whether a determination basis is reflected bright lines or reflected dark lines. As previously stated, each of the first and the second left reflected structured lights SL1 and SL2, and the first and the second right reflected structured lights SR1 and SR2 includes plural reflected bright lines and plural reflected dark lines. The reflected bright and dark lines have similar characteristics.

That is, as the touch point gets closer to the sensor, in the reflected structured light generated, the width of the reflected bright/dark lines becomes wider. The description below is given by taking the reflected bright lines as an example. Details of applications of the reflected dark lines can be understood by a person having ordinary skill in the art, and shall be omitted herein.

In brief, in step S17, according to sensing results of the first sensor M1 the widths of the reflected bright lines of the first and the second left reflected structured lights SL1 and SL2 are compared (in equivalence a comparison result of relative distances at left side); and, according to sensing results of the second sensor M2, the width of the reflected bright lines of the first and the second right reflected structured lights SR1 and SR2 are compared (in equivalence a comparison result of relative distances at right side).

Figure 17A:
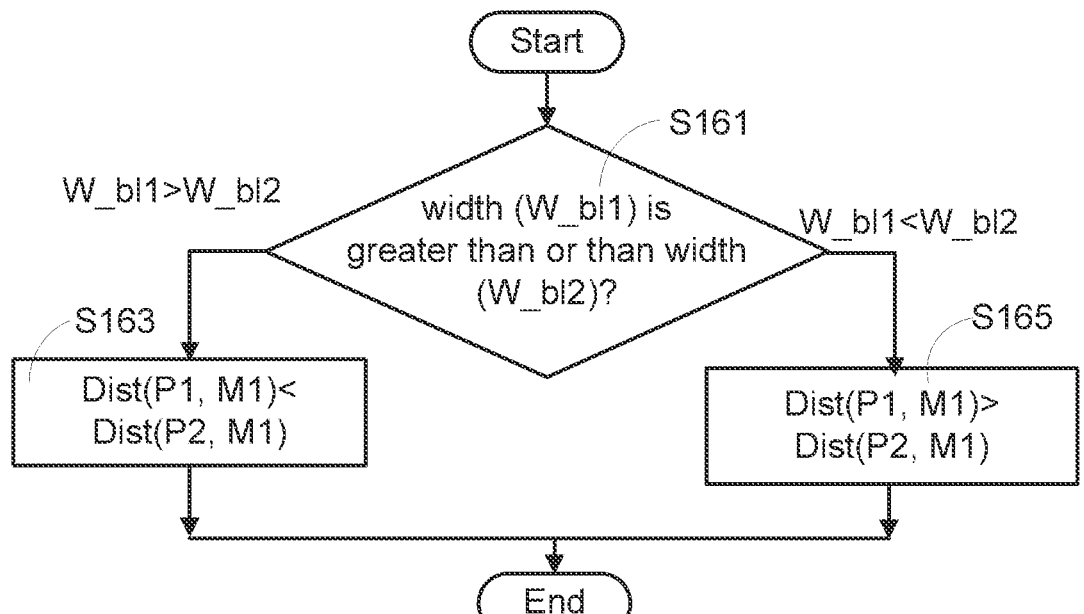
FIG. 17A is a detailed flowchart of the controller determining which left relative distance is farther.
Figure 17B:
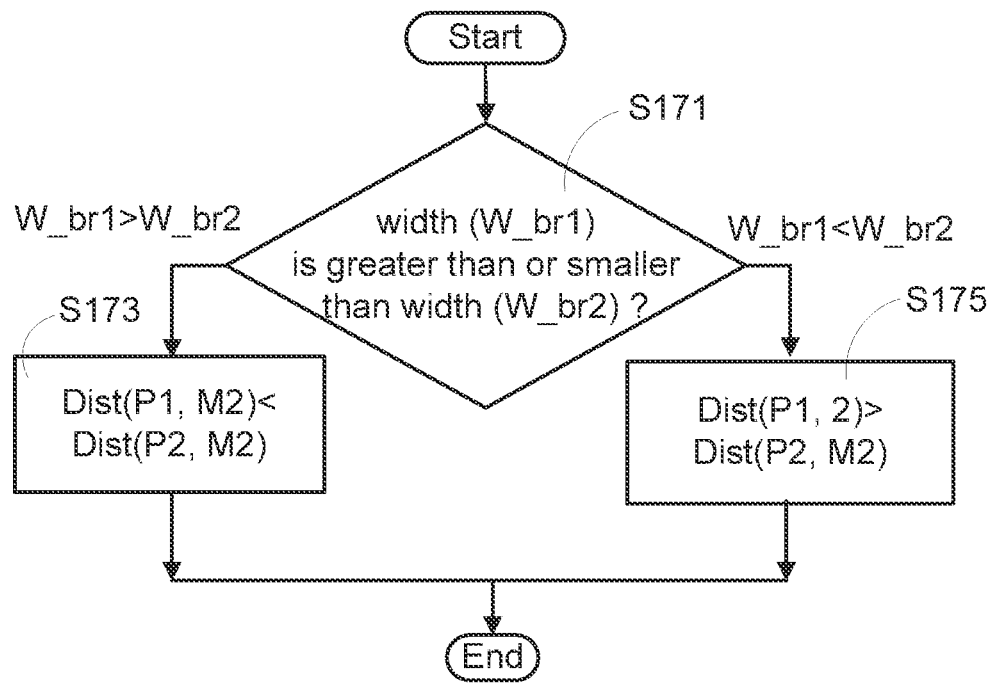
FIG. 17B is a detailed flowchart of the controller determining which right relative distance is farther.

With reference to FIG. 17A, how the controller determines which of the first left relative distance Dist(P1, M1) and the second left relative distance Dist(P2, M1) is farther by comparing widths W_bl1 and W_bl2 of the reflected bright lines of the first and the second left reflected structured light SL1 and SL2 are described below. With reference to FIG. 17B, how the controller determines which of the first and the second right relative distance Dist(P1 M2) and Dist(P2. M2) is farther by comparing widths W_br1 and W_br2 of the reflected bright lines of the first and the second right reflected structured light SR1 and SR2 are described below.

FIG. 17A shows a detailed flowchart of the controller determining which left relative distance is farther. In step S161, the width W_bl1 of the reflected bright lines of the first left reflected structured light SL1 and the width W_bl2 of the reflected bright lines of the second left reflected structured light SL2 are compared.

In step S163, when the width W_bl1 of the reflected bright lines of the first left reflected structured light SL1 is greater than the width W_bl2 of the reflected bright lines of the second left reflected structured light SL2, the controller determines that the first left relative distance Dist(P1, M1) is smaller/shorter than the second left relative distance Dist(P2, M1). That is, according to the relationship of (W_bl1>W_bl2), it is determined Dist(P1, M1)<Dist(P2, M1).

In step S165, when the width W_bl1 of the reflected bright lines of the first left reflected structured light SL1 is smaller than the width W_bl2 of the reflected bright lines of the second left reflected structured light SL2 , the controller determines that the first left relative distance Dist(P1, M1) is greater/farther than the second left relative distance Dist(P2, M1). That is, according to the relationship of (W_bl1<W_bl2), it is determined Dist(P1, M1)>Dist(P2, M1).

Therefore, when two objects exist, the comparison of the left relative distances is either of the two situations below. In the first situation, Dist(P1, M1)<Dist(P2, M1). In the second situation, Dist(P1, M1)>Dist(P2, M1).

FIG. 17B shows a detailed flowchart of the controller determining which right relative distance is farther. In step S171, the widths W_br1 and W_br2 of the reflected bright lines of the first and the second right reflected structured lights SR1 and SR2 are compared.

In step S173, when the width W_br1 of the reflected bright lines of the right left reflected structured light SR1 is greater than the width W_br2 of the reflected bright lines of the second right reflected structured light SL2, the controller determines that the first right relative distance Dist(P1, M2) is smaller/shorter than the second right relative distance Dist (P2, M2). That is, according to the relationship of (W_br1>W_br2), it is determined Dist(P1, M2)<Dist(P2, M2).

In step S175, when the width W_br1 of the reflected bright lines of the first right reflected structured light SR1 is smaller than the width W_br2 of the reflected bright lines of the second right reflected structured light SR2, the controller determines that the first right relative distance Dist(P1, M2) is greater/farther than the second right relative distance Dist(P2, M2). That is, according to the relationship of (W_br1<W_br2), it is determined Dist(P1, M2)>Dist(P2, M2).

Therefore, when two objects exist, the comparison of the right relative distances is either of the two situations below. In the first situation, Dist(P1 M2)<Dist(P2, M2). In the second situation, Dist(P1, M2)>Dist(P2, M2).

Once the controller obtains the comparison result of the left relative distances and the comparison result of the right relative distances, the controller is capable of correctly selecting the touch points from various combinations of candidate touch positions.

The number of candidate touch positions increases as the number of touch point increases. At this point, appropriate modifications can be made to the embodiments of the present invention to eliminate ghost points and select actual positions of the touch points from the candidate touch positions. In the present invention, the numbers of left and the right reflected structured lights are determined according to the number of touch points. That is, as the number of touch point increases, the numbers of the left and the right reflected structured lights are also increased.

Further, according to a concept of the present invention, positions for disposing the light sources and sensors on the display panel are not limited. By a person having ordinary skill in the art to adjust the position of the controller and to further determine the positions of the touch points, modifications may be made to the method for determining relative distances by the reflected structured lights of the present invention.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch control apparatus, for selecting touch points corresponding to at least two objects from a plurality of candidate touch positions, the touch control apparatus comprising:
   a display panel;
   a first light source, located at a left side of the display panel, for generating a first initial structured light comprising a plurality of first initial bright lines and a plurality of first initial dark lines, wherein the first initial structured light is reflected by the at least two objects to form a first reflected light distribution;
   a first sensor, for sensing a first left reflected structured light and a second left reflected structured light in the first reflected light distribution, wherein the first left reflected structured light and the second left reflected structured light respectively comprise a plurality of alternating reflected bright lines and reflected dark lines;

a second light source, located at a right side of the display panel, for generating a second initial structured light comprising a plurality of second initial bright lines and a plurality of second initial dark lines, wherein the second initial structured light is reflected by the at least two objects to form a second reflected light distribution;

a second sensor, for sensing a first right reflected structured light and a second right reflected structured light in the second reflected light distribution, wherein the first right reflected structured light and the second right reflected structured light respectively comprise a plurality of alternating reflected bright lines and reflected dark lines; and a controller, electrically coupled to the first sensor and the second sensor, for selecting the touch points corresponding to the at least two objects from the plurality of candidate touch positions according to at least one of a first comparison result and a second comparison result, wherein the first comparison result is generated based on comparing a width of the reflected bright lines of the first left reflected structured light and a width of the reflected bright lines of the second left reflected structured light; and comparing a width of the reflected bright lines of the first right reflected structured light and a width of the reflected bright lines of the second right reflected structured light; and the second comparison result is generated based on comparing a width of the reflected dark lines of the first left reflected structured light and a width of the reflected dark lines of the second left reflected structured light; and comparing a width of the reflected dark lines of the first right reflected structured light and a width of the reflected dark lines of the second right reflected structured light.

2. The touch control apparatus according to claim 1, wherein a number of the left reflected structured lights and a number of the right reflected structured lights are determined according to a number of the at least two objects.

3. The touch control apparatus according to claim 1, wherein the first left reflected structured light and the first right reflected structured light correspond to a first touch point, and the second left reflected structured light and the second right reflected structured light correspond to a second touch point.

4. The touch control apparatus according to claim 3, wherein a relative distance between the first touch point and the first sensor is a first left relative distance, a relative distance between the second touch point and the first sensor is a second left relative distance, a relative distance between the first touch point and the second sensor is a first right relative distance, and a relative distance between the second touch point and the second sensor is a second right relative distance.

5. The touch control apparatus according to claim 4, wherein the controller compares the first left reflected structured light and the second left reflected structured light; and compares the first right reflected structured light and the second right reflected structured light.

6. The touch control apparatus according to claim 4, wherein when the width of the reflected bright lines of the first left reflected structured light is greater than that of the second left reflected structured light, the first left relative distance is smaller than the second left relative distance; and when the width of the reflected bright lines of the first left reflected structured light is smaller than that of the second left reflected structured light, the first left relative distance is greater than the second left relative distance.

7. The touch control apparatus according to claim 4, wherein when the width of the reflected bright lines of the first right reflected structured light is greater than that of the second right reflected structured light, the first right relative distance is smaller than the second right relative distance; and when the width of the reflected bright lines of the first right reflected structured light is smaller than that of the second right reflected structured light, the first right relative distance is greater than the second right relative distance.

8. The touch control apparatus according to claim 4, wherein when the width of the reflected dark lines of the first left reflected structured light is greater than that of the second left reflected structured light, the first left relative distance is smaller than the second left relative distance; and when the width of the reflected dark lines of the first left reflected structured light is smaller than that of the second left reflected structured light, the first left relative distance is greater than the second left relative distance.

9. The touch control apparatus according to claim 4, wherein when the width of the reflected dark lines of the first right reflected structured light is greater than that of the second right reflected structured light, the first right relative distance is smaller than the second right relative distance; and when the width of the reflected dark lines of the first right reflected structured light is smaller than that of the second right reflected structured light, the first right relative distance is greater than the second right relative distance.

10. The touch control apparatus according to claim 1, wherein the first light source emits a first emitted light and the second light source emits a second emitted light, the touch control apparatus further comprising:

a first collimation lens, disposed in front of the first light source, for condensing the first emitted light to form a first dot light source;

a first filter, disposed in front of the first collimation lens, for forming the first plane light from the first dot light source;

a first shutter having a first texture pattern, disposed in front of the first filter, for converting the first plane light to the plurality of first initial bright lines and the plurality of second initial dark lines;

a second collimation lens, disposed in front of the second light source, for condensing the second emitted light to form a second dot light source;

a second filter, disposed in front of the second collimation lens, for forming the second plane light from the second dot light source; and a second shutter having a second texture pattern, disposed in front of the second filter, for converting the second plane light to the plurality of second initial bright lines and the plurality of second initial dark lines.

11. The touch control apparatus according to claim 1, wherein widths of the first initial bright lines are substantially equal, widths of the second initial bright lines are substantially equal, widths of the first initial dark lines are substantially equal, and widths of the second initial dark lines are substantially equal.

12. The touch control apparatus according to claim 1, wherein the display panel is a rectangle having a first side, a second side, a third side and a fourth side, wherein the first side and the third side are parallel, the second side and the fourth side are parallel, wherein the first light source is disposed at an included angle formed by the first side and the four side, and the second light source is disposed at an included angle formed by the third side and the fourth side.

13. A selection method, for selecting touch points corresponding to at least two objects from a plurality of candidate touch positions on a touch control apparatus, the selection method comprising:
   driving a first light source to generate a first initial structured light comprising a plurality of first initial bright lines and a plurality of first initial dark lines, wherein the at least two objects reflect the first initial structured light to form a first reflected light distribution;
   sensing a first left reflected structured light and a second left reflected structured light in the first reflected light distribution, wherein the first left reflected structured light and the second left reflected structured light respectively comprise a plurality of alternating reflected bright lines and reflected dark lines;
   driving a second light source to generate a second initial structured light comprising a plurality of second initial bright lines and a plurality of second initial dark lines, wherein the at least two objects reflect the second initial structured light to form a second reflected structured light;
   sensing a first right reflected structured light and a second right reflected structured light in the second reflected light distribution, wherein the first right reflected structured light and the second right reflected structured light respectively comprise a plurality of alternating reflected bright lines and reflected dark lines; and
   selecting the touch points corresponding to the at least two objects from the plurality of candidate touch positions according to at least one of a first comparison result and a second comparison result, wherein
   the first comparison result is generated based on
   comparing a width of the reflected bright lines of the first left reflected structured light and a width of the reflected bright lines of the second left reflected structured light; and
   comparing a width of the reflected bright lines of the first right reflected structured light and a width of the reflected bright lines of the second right reflected structured light; and
   the second comparison result is generated based on
   comparing a width of the reflected dark lines of the first left reflected structured light and a width of the reflected dark lines of the second left reflected structured light; and
   comparing a width of the reflected dark lines of the first right reflected structured light and a width of the reflected dark lines of the second right reflected structured light.

14. The selection method according to claim 13, wherein a number of the left reflected structured lights and a number of the right reflected structured lights are determined according to a number of the at least two objects.

15. The selection method according to claim 13, wherein the first left reflected structured light and the first right reflected structured light correspond to a first touch point, and the second left reflected structured light and the second right reflected structured light correspond to a second touch point.

16. The selection method according to claim 15, wherein a relative distance between the first touch point and a first sensor of the touch control apparatus is a first left relative distance, a relative distance between the second touch point and the first sensor is a second left relative distance, a relative distance between the first touch point and a second sensor of the touch control apparatus is a first right relative distance, and a relative distance between the second touch point and the second sensor is a second right relative distance.

17. The selection method according to claim 16, wherein the step of selecting the touch points corresponding to the at least two objects from the plurality of candidate touch positions according to the at least one of the first comparison result and the second comparison result comprises steps of:
   comparing the first left reflected structured light and the second left reflected structured light; and
   comparing the first right reflected structured light and the second right reflected structured light.

18. The selection method according to claim 16, wherein the step of comparing the width of the reflected bright lines of the first left reflected structured light and the width of the reflected bright lines of the second left reflected structured light comprises:
   when the width of the reflected bright lines of the first left reflected structured light is greater than that of the second left reflected structured light, determining the first left relative distance as being smaller than the second left relative distance; and
   when the width of the reflected bright lines of the first left reflected structured light is smaller than that of the second left reflected structured light, determining the first left relative distance as being greater than the second left relative distance.

19. The selection method according to claim 16, wherein the step of comparing the width of the reflected dark lines of the first left reflected structured light and the width of the reflected dark lines of the second left reflected structured light comprises:
   when the width of the reflected dark lines of the first left reflected structured light is greater than that of the second left reflected structured light, determining the first left relative distance as being smaller than the second left relative distance; and
   when the width of the reflected dark lines of the first left reflected structured light is smaller than that of the second left reflected structured light, determining the first left relative distance as being greater than the second left relative distance.

20. The selection method according to claim 16, wherein the step of comparing the width of the reflected bright lines of the first right reflected structured light and the width of the reflected bright lines of the second right reflected structured light comprises:
   when the width of the reflected bright lines of the first right reflected structured light is greater than that of the second right reflected structured light, determining the first right relative distance as being smaller than the second right relative distance; and
   when the width of the reflected bright lines of the first right reflected structured light is smaller than that of the second right reflected structured light, determining the first right relative distance as being greater than the second right relative distance.

21. The selection method according to claim 16, wherein the step of comparing the width of the reflected dark lines of the first right reflected structured light and the width of the reflected dark lines of the second right reflected structured light comprises:

when the width of the reflected dark lines of the first right reflected structured light is greater than that of the second right reflected structured light, determining the first right relative distance as being smaller than the second right relative distance; and when the width of the reflected dark lines of the first right reflected structured light is smaller than that of the second right reflected structured light, determining the first right relative distance as being greater than the second right relative distance.

22. The selection method according to claim 13, wherein widths of the first initial bright lines are substantially equal, widths of the second initial bright lines are substantially equal, widths of the first initial dark lines are substantially equal, and widths of the second initial dark lines are substantially equal.

* * * * *